(12) United States Patent  (10) Patent No.: US 7,925,889 B2
Blair  (45) Date of Patent: Apr. 12, 2011

(54) METHOD AND SYSTEM FOR COMMUNICATIONS MONITORING

(75) Inventor: Christopher Douglas Blair, South Chailey (GB)

(73) Assignee: Verint Americas Inc., Roswell, GA (US)

( * ) Notice: Subject to any disclaimer, the term of this patent is extended or adjusted under 35 U.S.C. 154(b) by 583 days.

(21) Appl. No.: 10/525,260

(22) PCT Filed: Aug. 21, 2003

(86) PCT No.: PCT/GB03/03668
§ 371 (c)(1),
(2), (4) Date: Feb. 22, 2005

(87) PCT Pub. No.: WO2004/019585
PCT Pub. Date: Mar. 4, 2004

(65) Prior Publication Data
US 2006/0123106 A1  Jun. 8, 2006

(30) Foreign Application Priority Data

Aug. 21, 2002 (GB) .................................. 0219493.4

(51) Int. Cl.
*G06F 11/30* (2006.01)
*G06F 12/14* (2006.01)
(52) U.S. Cl. ...................................................... 713/189
(58) Field of Classification Search .................. 713/189; 709/224
See application file for complete search history.

(56) References Cited

U.S. PATENT DOCUMENTS

| | | | |
|---|---|---|---|
| 3,594,919 | A | 7/1971 | De Bell et al. |
| 3,705,271 | A | 12/1972 | De Bell et al. |
| 4,510,351 | A | 4/1985 | Costello et al. |
| 4,684,349 | A | 8/1987 | Ferguson et al. |
| 4,694,483 | A | 9/1987 | Cheung |
| 4,763,353 | A | 8/1988 | Canale et al. |
| 4,815,120 | A | 3/1989 | Kosich |
| 4,924,488 | A | 5/1990 | Kosich |
| 4,953,159 | A | 8/1990 | Hayden et al. |
| 5,016,272 | A | 5/1991 | Stubbs et al. |
| 5,101,402 | A | 3/1992 | Chiu et al. |
| 5,117,225 | A | 5/1992 | Wang |
| 5,210,789 | A | 5/1993 | Jeffus et al. |
| 5,239,460 | A | 8/1993 | LaRoche |
| 5,241,625 | A | 8/1993 | Epard et al. |

(Continued)

FOREIGN PATENT DOCUMENTS

EP  0453128 A2  10/1991

(Continued)

OTHER PUBLICATIONS

"Customer Spotlight: Navistar International," Web page, unverified print date of Apr. 1, 2002.

(Continued)

*Primary Examiner* — Kambiz Zand
*Assistant Examiner* — Stephen Sanders
(74) *Attorney, Agent, or Firm* — Lawrence A. Aaronson, PC

(57) ABSTRACT

The present invention provides for a system, and related method, for use in the monitoring of communications traffic, comprising the step of recording the said traffic and storing the recorded traffic in an encrypted data format such that the data can be decrypted only by means of keys that exhibit restricted availability.

13 Claims, 1 Drawing Sheet

U.S. PATENT DOCUMENTS

| | | |
|---|---|---|
| 5,267,865 A | 12/1993 | Lee et al. |
| 5,299,260 A | 3/1994 | Shaio |
| 5,311,422 A | 5/1994 | Loftin et al. |
| 5,315,711 A | 5/1994 | Barone et al. |
| 5,317,628 A | 5/1994 | Misholi et al. |
| 5,347,306 A | 9/1994 | Nitta |
| 5,388,252 A | 2/1995 | Dreste et al. |
| 5,396,371 A | 3/1995 | Henits et al. |
| 5,432,715 A | 7/1995 | Shigematsu et al. |
| 5,465,286 A | 11/1995 | Clare et al. |
| 5,475,625 A | 12/1995 | Glaschick |
| 5,485,569 A | 1/1996 | Goldman et al. |
| 5,491,780 A | 2/1996 | Fyles et al. |
| 5,499,291 A | 3/1996 | Kepley |
| 5,535,256 A | 7/1996 | Maloney et al. |
| 5,572,652 A | 11/1996 | Robusto et al. |
| 5,577,112 A | 11/1996 | Cambray et al. |
| 5,590,171 A | 12/1996 | Howe et al. |
| 5,597,312 A | 1/1997 | Bloom et al. |
| 5,619,183 A | 4/1997 | Ziegra et al. |
| 5,696,906 A | 12/1997 | Peters et al. |
| 5,717,879 A | 2/1998 | Moran et al. |
| 5,721,842 A | 2/1998 | Beasley et al. |
| 5,742,670 A | 4/1998 | Bennett |
| 5,748,499 A | 5/1998 | Trueblood |
| 5,778,182 A | 7/1998 | Cathey et al. |
| 5,784,452 A | 7/1998 | Carney |
| 5,790,798 A | 8/1998 | Beckett, II et al. |
| 5,796,952 A | 8/1998 | Davis et al. |
| 5,809,247 A | 9/1998 | Richardson et al. |
| 5,809,250 A | 9/1998 | Kisor |
| 5,825,869 A | 10/1998 | Brooks et al. |
| 5,835,572 A | 11/1998 | Richardson, Jr. et al. |
| 5,862,330 A | 1/1999 | Anupam et al. |
| 5,864,772 A | 1/1999 | Alvarado et al. |
| 5,884,032 A | 3/1999 | Bateman et al. |
| 5,907,680 A | 5/1999 | Nielsen |
| 5,914,951 A * | 6/1999 | Bentley et al. ............... 370/352 |
| 5,918,214 A | 6/1999 | Perkowski |
| 5,923,746 A | 7/1999 | Baker et al. |
| 5,933,811 A | 8/1999 | Angles et al. |
| 5,944,791 A | 8/1999 | Scherpbier |
| 5,948,061 A | 9/1999 | Merriman et al. |
| 5,958,016 A | 9/1999 | Chang et al. |
| 5,964,836 A | 10/1999 | Rowe et al. |
| 5,978,648 A | 11/1999 | George et al. |
| 5,982,857 A | 11/1999 | Brady |
| 5,987,466 A | 11/1999 | Greer et al. |
| 5,990,852 A | 11/1999 | Szamrej |
| 5,991,373 A | 11/1999 | Pattison et al. |
| 5,991,796 A | 11/1999 | Anupam et al. |
| 6,005,932 A | 12/1999 | Bloom |
| 6,009,429 A | 12/1999 | Greer et al. |
| 6,014,134 A | 1/2000 | Bell et al. |
| 6,014,647 A | 1/2000 | Nizzari et al. |
| 6,018,619 A | 1/2000 | Allard et al. |
| 6,035,332 A | 3/2000 | Ingrassia et al. |
| 6,038,544 A | 3/2000 | Machin et al. |
| 6,039,575 A | 3/2000 | L'Allier et al. |
| 6,057,841 A | 5/2000 | Thurlow et al. |
| 6,058,163 A | 5/2000 | Pattison et al. |
| 6,061,798 A | 5/2000 | Coley et al. |
| 6,072,860 A | 6/2000 | Kek et al. |
| 6,076,099 A | 6/2000 | Chen et al. |
| 6,078,894 A | 6/2000 | Clawson et al. |
| 6,091,712 A | 7/2000 | Pope et al. |
| 6,108,711 A | 8/2000 | Beck et al. |
| 6,122,665 A | 9/2000 | Bar et al. |
| 6,122,668 A | 9/2000 | Teng et al. |
| 6,130,668 A | 10/2000 | Stein |
| 6,138,139 A | 10/2000 | Beck et al. |
| 6,144,991 A | 11/2000 | England |
| 6,146,148 A | 11/2000 | Stuppy |
| 6,151,622 A | 11/2000 | Fraenkel et al. |
| 6,154,771 A | 11/2000 | Rangan et al. |
| 6,157,808 A | 12/2000 | Hollingsworth |
| 6,171,109 B1 | 1/2001 | Ohsuga |
| 6,182,094 B1 | 1/2001 | Humpleman et al. |
| 6,195,679 B1 | 2/2001 | Bauersfeld et al. |
| 6,201,948 B1 | 3/2001 | Cook et al. |
| 6,211,451 B1 | 4/2001 | Tohgi et al. |
| 6,225,993 B1 | 5/2001 | Lindblad et al. |
| 6,229,894 B1 * | 5/2001 | Van Oorschot et al. ...... 713/150 |
| 6,230,197 B1 | 5/2001 | Beck et al. |
| 6,236,977 B1 | 5/2001 | Verba et al. |
| 6,244,758 B1 | 6/2001 | Solymar et al. |
| 6,282,548 B1 | 8/2001 | Burner et al. |
| 6,286,030 B1 | 9/2001 | Wenig et al. |
| 6,286,046 B1 | 9/2001 | Bryant |
| 6,288,753 B1 | 9/2001 | DeNicola et al. |
| 6,289,340 B1 | 9/2001 | Purnam et al. |
| 6,301,462 B1 | 10/2001 | Freeman et al. |
| 6,301,573 B1 | 10/2001 | McIlwaine et al. |
| 6,324,282 B1 | 11/2001 | McIlwaine et al. |
| 6,347,374 B1 | 2/2002 | Drake et al. |
| 6,351,467 B1 | 2/2002 | Dillon |
| 6,353,851 B1 | 3/2002 | Anupam et al. |
| 6,360,250 B1 | 3/2002 | Anupam et al. |
| 6,370,574 B1 | 4/2002 | House et al. |
| 6,404,857 B1 | 6/2002 | Blair et al. |
| 6,411,989 B1 | 6/2002 | Anupam et al. |
| 6,418,471 B1 | 7/2002 | Shelton et al. |
| 6,459,787 B2 | 10/2002 | McIlwaine et al. |
| 6,487,195 B1 | 11/2002 | Choung et al. |
| 6,493,758 B1 | 12/2002 | McLain |
| 6,502,131 B1 | 12/2002 | Vaid et al. |
| 6,510,220 B1 | 1/2003 | Beckett, II et al. |
| 6,535,909 B1 | 3/2003 | Rust |
| 6,542,602 B1 | 4/2003 | Elazer |
| 6,546,405 B2 | 4/2003 | Gupta et al. |
| 6,560,328 B1 | 5/2003 | Bondarenko et al. |
| 6,583,806 B2 | 6/2003 | Ludwig et al. |
| 6,606,657 B1 | 8/2003 | Zilberstein et al. |
| 6,665,644 B1 | 12/2003 | Kanevsky et al. |
| 6,674,447 B1 | 1/2004 | Chiang et al. |
| 6,683,633 B2 | 1/2004 | Holtzblatt et al. |
| 6,697,858 B1 | 2/2004 | Ezerzer et al. |
| 6,724,887 B1 * | 4/2004 | Eilbacher et al. ........ 379/265.03 |
| 6,738,456 B2 | 5/2004 | Wrona et al. |
| 6,757,361 B2 | 6/2004 | Blair et al. |
| 6,772,396 B1 | 8/2004 | Cronin et al. |
| 6,775,377 B2 | 8/2004 | McIlwaine et al. |
| 6,792,575 B1 | 9/2004 | Samaniego et al. |
| 6,810,414 B1 | 10/2004 | Brittain |
| 6,820,083 B1 | 11/2004 | Nagy et al. |
| 6,823,384 B1 | 11/2004 | Wilson et al. |
| 6,870,916 B2 | 3/2005 | Henrikson et al. |
| 6,901,438 B1 | 5/2005 | Davis et al. |
| 6,959,078 B1 * | 10/2005 | Eilbacher et al. ........ 379/265.03 |
| 6,965,886 B2 | 11/2005 | Govrin et al. |
| 2001/0000962 A1 | 5/2001 | Rajan |
| 2001/0032335 A1 | 10/2001 | Jones |
| 2001/0043697 A1 * | 11/2001 | Cox et al. ................. 379/265.06 |
| 2002/0038363 A1 | 3/2002 | MacLean |
| 2002/0052948 A1 | 5/2002 | Baudu et al. |
| 2002/0065911 A1 | 5/2002 | von Klopp et al. |
| 2002/0065912 A1 | 5/2002 | Catchpole et al. |
| 2002/0128925 A1 | 9/2002 | Angeles |
| 2002/0143925 A1 | 10/2002 | Pricer et al. |
| 2002/0165954 A1 | 11/2002 | Eshghi et al. |
| 2003/0055883 A1 | 3/2003 | Wiles et al. |
| 2003/0079020 A1 | 4/2003 | Gourraud et al. |
| 2003/0144900 A1 | 7/2003 | Whitmer |
| 2003/0154240 A1 | 8/2003 | Nygren et al. |
| 2004/0100507 A1 | 5/2004 | Hayner et al. |
| 2004/0165717 A1 | 8/2004 | McIlwaine et al. |
| 2005/0138560 A1 | 6/2005 | Lee et al. |

FOREIGN PATENT DOCUMENTS

| | | |
|---|---|---|
| EP | 0773687 A2 | 5/1997 |
| EP | 0989720 | 3/2000 |
| GB | 2369263 | 5/2002 |
| WO | WO 98/43380 | 11/1998 |
| WO | WO 00/16207 | 3/2000 |

OTHER PUBLICATIONS

"DKSystems Integrates QM Perception with OnTrack for Training," Web page, unverified print date of Apr. 1, 2002, unverified cover date of Jun. 15, 1999.
"OnTrack Online" Delivers New Web Functionality, Web page, unverified print date of Apr. 1, 2002, unverified cover date of Oct. 5, 1999.
"PriceWaterouseCoopers Case Study" The Business Challenge, Web page, unverified cover date of 2000.
Abstract, net.working: "An Online Webliography," *Technical Training* pp. 4-5 (Nov.-Dec. 1998).
Adams et al., "Our Turn-of-the-Century Trend Watch" *Technical Training* pp. 46-47 (Nov./Dec. 1998).
Barron, "The Road to Performance: Three Vignettes," *Technical Skills and Training* pp. 12-14 (Jan. 1997).
Bauer, "Technology Tools: Just-in-Time Desktop Training is Quick, Easy, and Affordable," *Technical Training* pp. 8-11 (May/Jun. 1998).
Beck et al., "Applications of AI in Education," *AMC Crossroads* vol. 1: 1-13 (Fall 1996) Web page, unverified print date of Apr. 12, 2002.
Benson and Cheney, "Best Practices in Training Delivery," *Technical Training* pp. 14-17 (Oct. 1996).
Bental and Cawsey, "Personalized and Adaptive Systems for Medical Consumer Applications," Communications ACM 45(5): 62-63 (May 2002).
Benyon and Murray, "Adaptive Systems: from intelligent tutoring to autonomous agents," pp. 1-52, Web page, unknown date.
Blumenthal et al., "Reducing Development Costs with Intelligent Tutoring System Shells," pp. 1-5, Web page, unverified print date of Apr. 9, 2002, unverified cover date of Jun. 10, 1996.
Brusilosy et al., "Distributed intelligent tutoring on the Web," Proceedings of the 8$^{th}$ World Conference of the AIED Society, Kobe, Japan, Aug. 18-22, pp. 1-9 Web page, unverified print date of Apr. 12, 2002, unverified cover date of Aug. 18-22, 1997.
Brusilovsky and Pesin, ISIS-Tutor: An Intelligent Learning Environment for CD/ISIS Users, pp. 1-15 Web page, unverified print date of May 2, 2002.
Brusilovsky, "Adaptive Educational Systems on the World-Wide-Web: A Review of Available Technologies," pp. 1-10, Web Page, unverified print date of Apr. 12, 2002.
Byrnes et al., "The Development of a Multiple-Choice and True-False Testing Environment on the Web," pp. 1-8, Web page, unverified print date of Apr. 12, 2002, unverified cover date of 1995.
Calvi and DeBra, "Improving the Usability of Hypertext Coursewae through Adaptive Linking,"*ACM*, unknown page numbers (1997).
Coffey, "Are Performance Objectives Really Necessary?" *Technical Skills and Training* pp. 25-27 (Oct. 1995).
Cohen, "Knowledge Management's Killer App," pp. 1-11, Web page, unverified print date of Sep. 12, 2002, unverified cover date of 2001.
Cole-Gomolski, "New Ways to manage E-Classes," *Computerworld* 32(48):4344 (Nov. 30, 1998).
Cross: "Sun Microsystems—the SunTAN Story," Internet Time Group 8 (© 2001).
Cybulski and Linden, "Teaching Systems Analysis and Design Using Multimedia and Patterns," unknown date, unknown source.
De Bra et al., "Adaptive Hypermedia: From Systems to Framework,"*ACM* (2000).
De Bra, "Adaptive Educational Hypermedia on the Web," *Communications ACM* 45(5):60-61 (May 2002).
Dennis and Gruner, "Computer Managed Instruction at Arthur Andersen & Company: A Status Report,"*Educational Technical* pp. 7-16 (Mar. 1992).
Diessel et al., "Individualized Course Generation: A Marriage Between CAL and ICAL,"*Computers Educational* 22(1/2) 57-65 (1994).
Dyreson, "An Experiment in Class Management Using the World Wide Web," pp. 1-12, Web page, unverified print date of Apr. 12, 2002.
E Learning Community, "Excellence in Practice Award: Electronic Learning Technologies,"*Personal Learning Network* pp. 1-11, Web page, unverified print date of Apr. 12, 2002.

Eklund and Brusilovsky, "The Value of Adaptivity in Hypermedia Learning Environments: A Short Review of Empirical Evidence," pp. 1-8, Web page, unverified print date of May 2, 2002.
*e-Learning the future of learning* THINQ Limited, London, Version 1.0 (2000).
Eline, "A Trainer's Guide to Skill Building," *Technical Training* pp. 34-41 (Sep./Oct. 1998).
Eline, "Case Study: Briding the Gap in Canada's IT Skills," *Technical Skills and Training* pp. 23-25 (Jul. 1997).
Eline "Case Study: IBT's Place in the Sun," *Technical Training* pp. 12-17 (Aug./Sep. 1997).
Fritz, "CB templates for productivity: Authoring system templates for trainers,"*Emedia Professional* 10(8):6678 (Aug. 1997).
Fritz, "ToolBook II: Asymetrix's updated authoring software tackles the Web," *Emedia Professional* 10(20): 102106 (Feb. 1997).
Gibson et al., "A Comparative Analysis of Web-Based Testing and Evaluation Systems," pp. 1-8, Web page, unverified print date of Apr. 11, 2002.
Halberg and DeFiore, "Curving Toward Performance: Following a Hierarchy of Steps Toward a Performance Orientation," *Technical Skills and Training* pp. 9-11 (Jan. 1997).
Harsha, "Online Training 'Sprints' Ahead," *Technical Training* pp. 27-29 (Jan./Feb. 1999).
Heideman, "Training Technicians for a High-Tech Future: These six steps can help develop technician training for high-tech work," pp. 11-14 (Feb./Mar. 1995).
Heideman, "Writing Performance Objectives Simple as A-B-C (and D)," *Technical Skills and Training* pp. 5-7 (May/Jun. 1996).
Hollman, "Train Without Pain: The Benefits of Computer-Based Training Tools," pp. 1-11, Web page, unverified print date of Mar. 20, 2002, unverified cover date of Jan. 1, 2000.
Klein, "Command Decision Training Support Technology," Web page, unverified print date of Apr. 12, 2002.
Koonce, "Where Technology and Training Meet," *Technical Training* pp. 10-15 (Nov./Dec. 1998).
Kursh, "Going the distance with Web-based training," *Training and Development* 52(3): 5053 (Mar. 1998).
Larson, "Enhancing Performance Through Customized Online Learning Support,"*Technical Skills and Training* pp. 25-27 (May/Jun. 1997).
Linton, et al. "OWL: A Recommender System for Organization-Wide Learning," *Educational Technical Society* 3(1): 62-76 (2000).
Lucadamo and Cheney, "Best Practices in Technical Training," *Technical Training* pp. 21-26 (Oct. 1997).
McNamara, "Monitoring Solutions: Quality Must be Seen and Heard," *Inbound/Outbound* pp. 66-67 (Dec. 1989).
Merrill, "The New Component Design Theory: Instruction design for courseware authoring,"*Instructional Science* 16:19-34 (1987).
Minton-Eversole, "IBT Training Truths Behind the Hype," *Technical Skills and Training* pp. 15-19 (Jan. 1997).
Mizoguchi, "Intelligent Tutoring Systems: The Current State of the Art," Trans. IEICE E73(3):297-307 (Mar. 1990).
Mostow and Aist, "The Sounds of Silence: Towards Automated Evaluation of Student Leaning a Reading Tutor that Listens" *American Association for Artificial Intelligence*, Web page, unknown date Aug. 1997.
Mullier et al., "A Web base Intelligent Tutoring System," pp. 1-6, Web page, unverified print date of May 2, 2002.
Nash, Database Marketing, 1993, pp. 158-165, 172-185, McGraw Hill, Inc. USA.
Nelson et al. "The Assessment of *End-User Training Needs,*" *Communications ACM* 38(7):27-39 (Jul. 1995).
O'Herron, "CenterForce Technologies CenterForce Analyzer," Web page unverified print date of Mar. 2, 2002, unverified cover date of Jun. 1, 1999.
O'Roark, "Basic Skills Get a Boost," Technical Training pp. 10-13 (Jul./Aug. 1998).
Pamphlet, On Evaluating Educational Innovations[1] , authored by Alan Lesgold, unverified cover date of Mar. 5, 1998.
Papa et al., "A Differential Diagnostic Skills Assessment and Tutorial Tool," *Computer Education* 18(1-3):45-50 (1992).
PCT International Search Report, International Application No. PCT/US03/02541, mailed May 12, 2003.

Phaup, "New Software Puts Computerized Tests on the Internet: Presence Corporation announces breakthrough Question Mark™ Web Product," Web page, unverified print date of Apr. 1, 2002.

Phaup, "QM Perception™ Links with Integrity Training's WBT Manager™ to Provide Enhanced Assessments of Web Based Courses," Web page, unverified print date of Apr. 1, 2002, unverified cover date of Mar. 25, 1999.

Phaup, "Question Mark Introduces Access Export Software," Web page, unverified print date of Apr. 2, 2002, unverified cover date of Mar. 1, 1997.

Phaup, "Question Mark Offers Instant Online Feedback for Web Quizzes and Questionnaires: Univerity of California assist with Beta Testing, Server scripts now available on high-volume users," Web page, unverified print date of Apr. 1, 2002, unverified cover date of May 6, 1996.

Piskurich, Now-You-See-'Em, Now-You-Don't Learning Centers, *Technical Training* pp. 18-21 (Jan./Feb. 1999).

Read, "Sharpening Agents' Skills," pp. 1-15, Web page, unverified print date of Mar. 20, 2002, unverified cover date of Oct. 1, 1999.

Reid, "On Target: Assessing Technical Skills," *Technical Skills and Training* pp. 6-8 (May/Jun. 1995).

Stormes, "Case Study: Restructuring Technical Training Using ISD," *Technical Skills and Training* pp. 23-26 (Feb./Mar. 1997).

Tennyson, "Artificial Intelligence Methods in Computer-Based Instructional Design," Journal of Instructional Development 7(3): 17-22 (1984).

The Editors, Call Center, "The Most Innovative Call Center Products We Saw in 1999," Web page, unverified print date of Mar. 20, 2002, unverified cover date of Feb. 1, 2000.

Tinoco et al., "Online Evaluation in WWW-based Courseware," *ACM* pp. 194-198 (1997).

Uiterwijk et al., "The virtual classroom," *InfoWorld* 20(47):6467 (Nov. 23, 1998).

Unknown Author, "Long-distance learning," *InfoWorld* 20(36):7676 (1998).

Untitled, 10th Mediterranean Electrotechnical Conference vol. 1 pp. 124-126 (2000).

Watson and Belland, "Use of Learner Data in Selecting Instructional Content for Continung Education," *Journal of Instructional Development* 8(4):29-33 (1985).

Weinschenk, "Performance Specifications as Change Agents," *Technical Training* pp. 12-15 (Oct. 1997).

Witness Systems promotional brochure for eQuality entitled "Building Customer Loyalty Through BusinessDriven Recording of Multimedia Interactions in your Contact Center," (2000).

Aspect Call Center Product Specification, "Release 2.0", Aspect Telecommuications Corporation, May 23, 1998 798.

Metheus X Window Record and Playback, XRP Features and Benefits, 2 pages Sep. 1994 LPRs.

"Keeping an Eye on Your Agents," Call Center Magazine, pp. 32-34, Feb. 1993 LPRs & 798.

Anderson: Interactive TVs New Approach, The Standard, Oct. 1, 1999.

Ante, *Everything You Ever Wanted to Know About Cryptography Legislation . . . (But Were to Sensible to Ask)*, PC world Online, Dec. 14, 1999.

Berst, *It's Baa-aack. How Interative TV is Sneaking Into Your Living Room*, The AnchorDesk, May 10, 1999.

Berst, *Why Interactive TV Won't Turn You On (Yet)*, The AnchorDesk, Jul. 13, 1999.

Borland and Davis, *US West Plans Web Services on TV*, CNETNews.com, Nov. 22, 1999.

Brown, *Let PC Technology Be Your TV Guide*, PC Magazine, Jun. 7, 1999.

Brown, *Interactive TV: The Sequel*, NewMedia, Feb. 10, 1998.

Cline, Déjà vu—*Will Interactive TV Make It This Time Around?*, DevHead, Jul. 9, 1999.

Crouch, *TV Channels on the Web*, PC World, Sep. 15, 1999.

D'Amico, *Interactive TV Gets $99 set-top box*, IDG.net, Oct. 6, 1999.

Davis, *Satellite Systems Gear Up for Interactive TV Fight*, CNETNews.com, Sep. 30, 1999.

Diederich, *Web TV Data Gathering Raises Privacy Concerns*, ComputerWorld, Oct. 13, 1998.

*EchoStar, MediaX Mix Interactive Multimedia With Interactive Television*, PRNews Wire, Jan. 11, 1999.

Furger, *The Internet Meets the Couch Potato*, PCWorld, Oct. 1996.

*Hong Kong Comes First with Interactive TV*, SCI-TECH, Dec. 4, 1997.

Needle, *Will The Net Kill Network TV?* PC World Online, Mar. 10, 1999.

Kane, *AOL-Tivo: You've Got Interactive TV*, ZDNN, Aug. 17, 1999.

Kay, *E-Mail in Your Kitchen*, PC World Online, 093/28/96.

Kenny, *TV Meets Internet*, PC World Online, Mar. 28, 1996.

Linderholm, *Avatar Debuts Home Theater PC*, PC World Online, Dec. 1, 1999.

Rohde, *Gates Touts Interactive TV*, InfoWorld, Oct. 14, 1999.

Ross, *Broadcasters Use TV Signals to Send Data*, PC World Oct. 1996.

Stewart, *Interactive Television at Home: Television Meets the Internet*, Aug. 1998.

Wilson, *U.S. West Revisits Interactive TV*, Interactive Week, Nov. 28, 1999.

\* cited by examiner

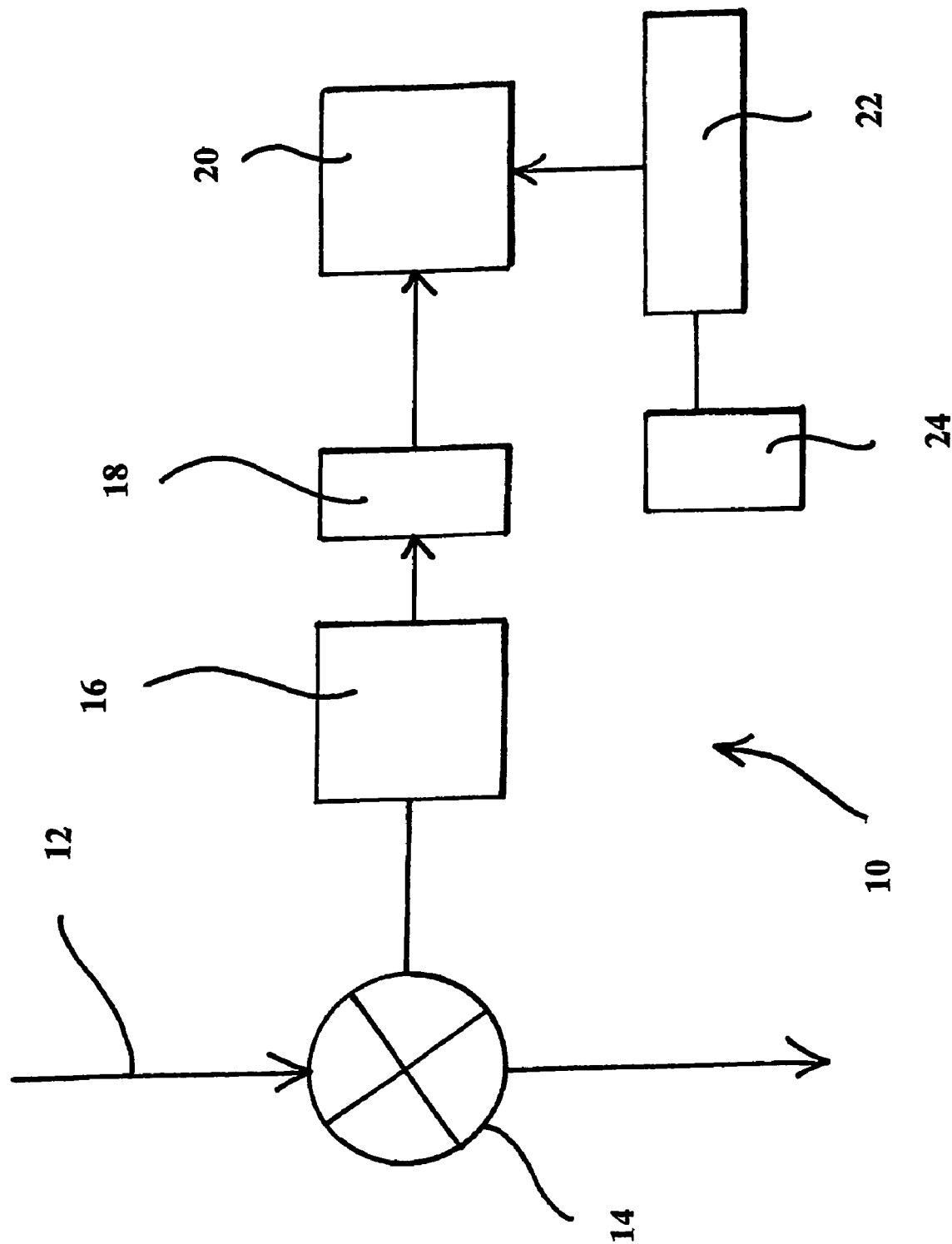

METHOD AND SYSTEM FOR COMMUNICATIONS MONITORING

The present invention relates to a method and system for communications monitoring and, in particular, to a method and system for use in the surveillance of communications traffic.

With the increase in commercial transactions conducted via the internet, or via a telephone call, commercial organisations have increasingly turned to recording technology to assist with monitoring the performance of their customer service employees who, quite commonly, might be located within a call centre designed specifically to handle a large number and variety of telephone enquires and transactions. It is therefore now quite common for such transactions to be monitored and prior warnings are given providing a customer with a clear indication that the conversation may be recorded for training and quality-control purposes. The recording of such transactions can also prove to be of assistance in meeting regularity requirements and enhancing the possibilities for dispute resolution.

The employment of such recording techniques has however remained very much in the commercial environment since the indiscriminate recording of, for example, telephone communications traffic in general, and including mere public communications traffic, carries with it far greater data protection and privacy issues.

Although it is known for law enforcement agencies to obtain authorisation to place wire-taps in order to monitor, for example, telephone communications involving a likely criminal source, such authorisation is granted only once particular criteria concerning the level of suspicion of the criminal source are met: which, of course somewhat disadvantageously can often prove to be after incriminating communications traffic has already been sent.

The present invention seeks to overcome such disadvantages with regard to the time-lag that can currently exist when seeking to monitor communications traffic and with regard to the likely occurrence of potentially incriminating traffic and the initiation of a monitoring/surveillance program.

According to a first aspect of the present invention, there is provided a method for use in the monitoring of communications traffic, and comprising the steps of recording the said traffic, storing the recorded traffic in an encrypted data format and such that this data can be decrypted only by means of decryption keys that exhibit restricted availability.

The method is particularly advantageous since it can allow for the recordal and encryption of all communications traffic so that potentially incriminating traffic from a later-identified criminal source has already been recorded and the restricted availability of the decryption keys can then allow for a means for accessing the potentially incriminating communications evidence in a same controlled manner as known wire-taps are currently permitted.

Preferably, the method can be implemented employing spare disk space, and/or CPU capacity within a currently existing telecommunications system. This has the particular advantage of allowing for implementation of the method at negligible additional cost.

Also, the decryption keys arranged to be issued in a secure and authorised manner can be arranged to contain encrypted search conditions serving to restrict their scope of use. For example, a "where" clause can be embedded within the decryption key so as to allow access only to those encrypted data records that match the authorised search criteria.

Further, the decryption key can contain discreet levels of authorisation for access to the encrypted data.

According to a further advantage, the decryption keys can be arranged to be used only once so as to advantageously prevent unauthorised subsequent searches through the recorded data.

Advantageously, the method includes the steps of logging all attempted accesses to the stored data. This can advantageously provide for secure and encrypted audit trail accessible only by means of specially granted keys available only to reviewing/auditing bodies rather than, for example, law enforcement agencies.

According to a further feature, the method can provide for the inclusion of tamper detection reference data.

Advantageously, the method is arranged to record all communications traffic and to likewise store all of the recorded traffic.

In particular, the method is applicable to communications traffic through a node such as a telecommunications switch, router or gateway.

Preferably, the method also includes the step of encrypting details concerning the communications traffic, which details are then also stored.

It will therefore be appreciated that the present invention can advantageously provide for a method for use in the monitoring of communications traffic as noted above and including the step of restricting the availability of the decryption keys in accordance with, in particular, legislative requirements.

According to another aspect of the present invention, there is provided a system for use in the monitoring of communications traffic and including means for recording the said traffic, means for storing the recorded traffic as encrypted data such that the data can be decrypted only by means of decryption keys that exhibits restricted availability.

The invention also preferably includes a system arranged to operate in accordance with the method steps outlined above.

The invention is described further hereinafter by way of example only, with reference to the accompanying drawing which comprises a schematic block diagram of a telecommunications monitoring system according to an embodiment of the present invention.

Turning now to the accompanying drawing, there is illustrated a telecommunications monitoring system 10 for monitoring communications traffic 12 travelling through, for example, a telecommunications switch 14. The system includes a recording device 16 that taps into the switch 14 so as to record all of the traffic passing there-through. The recorded traffic is then delivered to an encryption engine 18 which can employ any one or more of the appropriate currently available encryption schemes and in particular one or more of the 128-bit currently available encryption schemes.

The encrypted data is then delivered to the storage means 20 in which it can be stored for any appropriate amount of time, if not indefinitely, in accordance with legislative requirements. The encrypted data within the storage means 20 can be accessed and decrypted by means of decryption keys 22.

Typically, the available storage space can be recycled so as to provide a "first in first out" (FIFO) buffer of recordings which are retained for the maximum possible duration before being overwritten with more recent recordings.

However, an authorising system 24 is in place, which can be controlled by any appropriate authorising, or legislative body, such that the decryption keys 22 are only made available should specific criteria be met.

As an example, the decryption keys can be issued in a manner similar to currently existing schemes for authorising wire-taps.

The availability of so-called wire-tap warrants is currently closely controlled for example in the US by means of the Federal Communications Commission by means of the Communications Assistance for Law Enforcement Act 1994 whereas similar legislation has been introduced in the United Kingdom by means of the Regulation of Investigatory Powers Act 2000.

Such systems can advantageously allow for separate levels of authorisation such as the so-called "pen and trace" warrant or the "wire-tap" warrant controlled in the US under the above-mentioned Communication Assistance for Law Enforcement Act 1994.

Advantageously, the decryption keys can themselves contain encrypted search conditions so as to satisfactorily reduce, or eliminate, the chance of abuse and error. That is, if a warrant is issued to allow for the review of the calls only from one particular source, to one particular destination, or only calls within a particular time frame, appropriate clauses can be embedded within the decryption key so that only those encrypted records that match the quite specific criteria are made available.

Thus, as will be appreciated, and with particular reference to the enclosed drawing, the present invention provides for a particular advantageous concept in communications monitoring in which there is a no danger of important communications evidence being lost due to delays in seeking appropriate surveillance authorisation since the obtaining of such authorisation is time-shifted to a point at which the recording is made, and the granting of the authorisation relates merely to accessing a secure recording thereof.

It should be appreciated that the present invention is not restricted to the details of the foregoing embodiments. For example, the concept can be applied to any appropriate form of communication, and indeed the communication of any appropriate data and whether comprising audio, modem, fax or data network packet data such that, for example, PC terminal activity can also be monitored for subsequent review if authorised.

With regard to realisation of the concept it should be noted that telephone switch manufacturers could readily embed the capability of recording all calls in next generation switches for a few percent of the total cost of the system.

All calls could be recorded using heavy-weight encryption so as to maintain public confidence that the same controls were in place to grant access to recordings that are used today to authorise wire-tapping, i.e. decryption keys are only issued as a warrant is granted. Initially it may only be viable to retain such recordings for a few days although increasingly inexpensive storage capabilities will assist in increasing such periods.

This capability could be added to every cellular base station, every central office switch and every corporate switch.

The ability to go back through all calls made after the event by identified terrorists can have a significant effect on follow-up operations.

Whilst the concept of the wire-tapping of telephone lines is well known, the use of a PC can also be monitored.

For example, while programmers first introduced "log files" into specific applications as diagnostic aids to help them understand how someone broke their program, and from the concept of being able to note everything that happened on a PC goes back to the venerable tools like "PC Anywhere" it was a fairly small step from there to keeping a log file of everything that happened on the screen during your session.

More recently, this concept has been increasingly used in call centres to review maybe 1% of calls to see how customer service reps are using the computer system during phone calls.

Increasing amounts of business are conducted on mixed channels—with a caller on the line also looking at his browser where a staff member is highlighting terms and conditions on a competitor's web-site. Regulatory bodies have only just began to be aware of potential loop-holes in rules that insist on voice recording only. Where communication involves multiple channels it is vital that all channels are recorded together, archived together and replayable together.

The invention claimed is:

1. A method for monitoring of communications traffic, comprising:
   connecting a recorder to a network switch to record packet-data communication traffic received from, and passing through, the network switch;
   encrypting the packet-data communication traffic at an encryption engine communicatively connected to the recorder after the packet-data communication traffic has passed through the network switch to create encrypted data;
   storing the encrypted data in a storage device such that the encrypted data can be decrypted only by means of decryption keys that exhibit restricted availability; and
   providing the decryption keys having embedded encrypted search conditions therein to only provide access to encrypted data meeting criteria specified by the encrypted search conditions,
   wherein the criteria specify an identification of the portions of the packet-data communications traffic within the encrypted data to be decrypted.

2. The method as claimed in claim 1 further including employment of a spare disk and/or CPU capacity within a telecommunications system.

3. The method as claimed in claim 1, further including the step of employing separate levels of authorization for access to the stored data.

4. The method as claimed in claim 1, further including the step of employing a decryption key that is useable only once.

5. The method as claimed in claim 1, further including the step of logging all accesses to the stored data to an encrypted secure audit trail.

6. The method as claimed in claim 1, further including a tamper detection reference within the encrypted data.

7. The method as claimed in claim 1, further including the step of monitoring all the available communications traffic.

8. The method as claimed in claim 7, wherein the step of storing the recorded traffic comprises the step of recording all of the recorded traffic.

9. The method as claimed in claim 1, wherein the communications traffic to be recorded comprises traffic through a telecommunications switch, router or gateway.

10. The method as claimed in claim 1, further including the step of encrypting details relating to the communications traffic and storing the said encrypted details for subsequent access.

11. The method as claimed in claim 1, further including the step of authorizing use of the required decryption key in a restricted manner.

12. A system for monitoring of communications traffic, comprising:
   a recorder that records the communications traffic, the communications traffic being received by the recorder from a network switch;

an encryption engine that encrypts the communications traffic after the communications traffic has passed through the network switch to the recorder; and a storage device that stores recorded communications traffic as encrypted data, such that the encrypted data can be decrypted only by means of decryption keys that exhibit restricted availability, wherein encrypted search conditions are included within the keys that only provide access to encrypted data meeting criteria specified by the encrypted search conditions, and wherein the criteria specify an identification of the portions of the communications traffic within the encrypted data to be decrypted.

13. The system as claimed in claim 12 further including application software that executes any one or more of the following method steps:

the step of employing separate levels of authorization for access to the stored data;

the step of employing a decryption key that is useable only once;

the step of logging all accesses to the stored data to an encrypted secure audit trail;

the step of monitoring all the available communications traffic;

the step of storing the recorded traffic comprises the step of recording all of the recorded traffic;

the step of encrypting details relating to the communications traffic and storing the said encrypted details for subsequent access;

the step of authorizing use of the required decryption key in a restricted manner.

* * * * *